June 25, 1963  H. C. DUDLEY  3,095,167
APPARATUS FOR THE PROMOTION AND CONTROL OF VEHICULAR FLIGHT
Filed Jan. 5, 1960  3 Sheets-Sheet 1
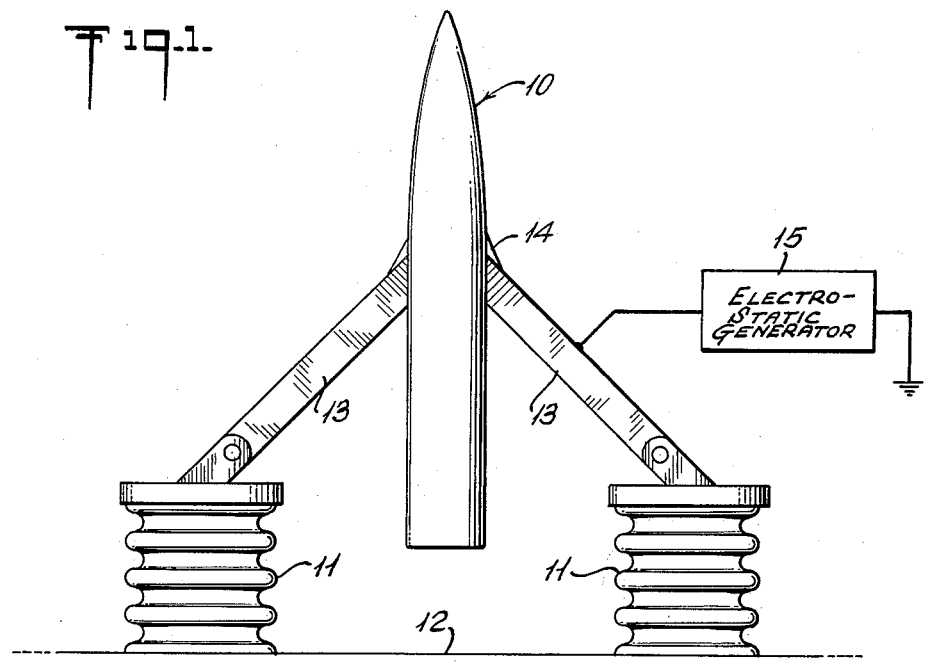
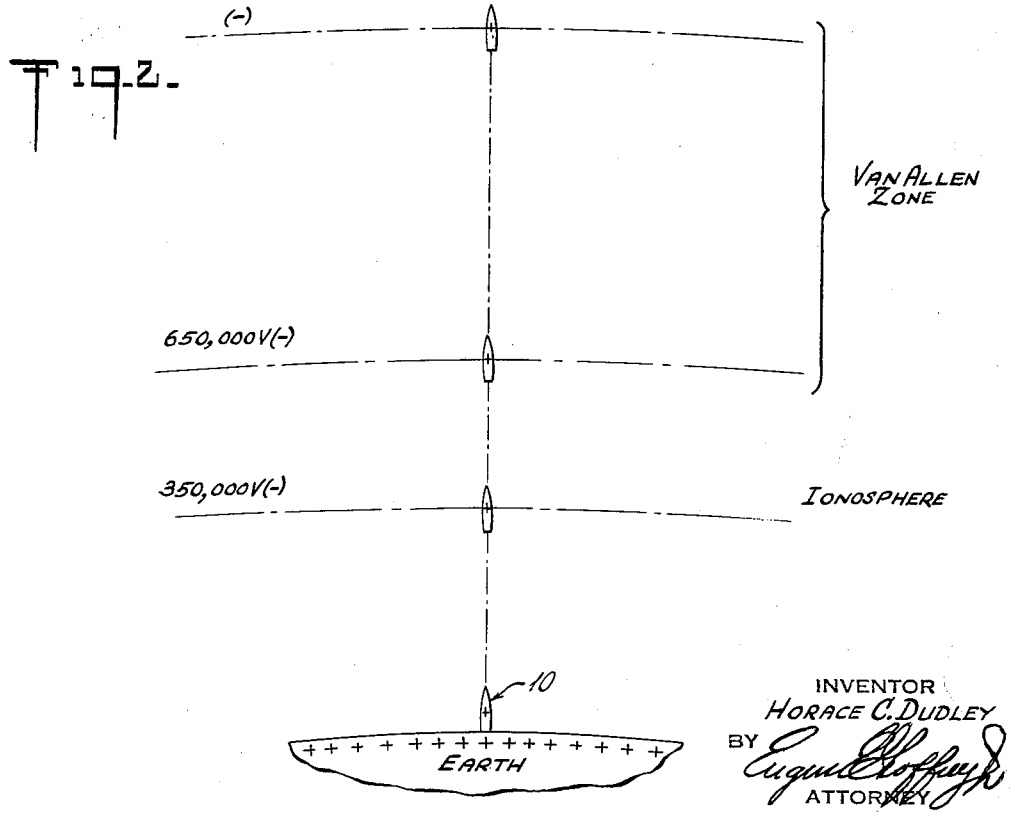
INVENTOR
HORACE C. DUDLEY
BY
ATTORNEY June 25, 1963  H. C. DUDLEY  3,095,167
APPARATUS FOR THE PROMOTION AND CONTROL OF VEHICULAR FLIGHT
Filed Jan. 5, 1960  3 Sheets-Sheet 2

INVENTOR
HORACE C. DUDLEY
BY
ATTORNEY

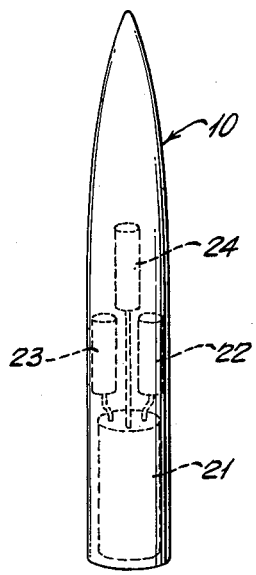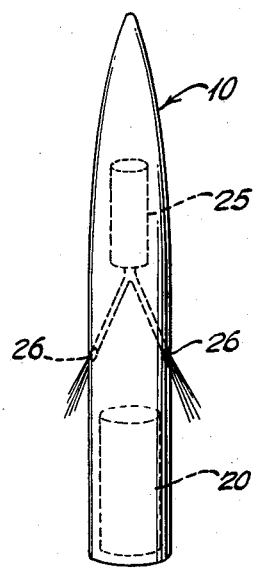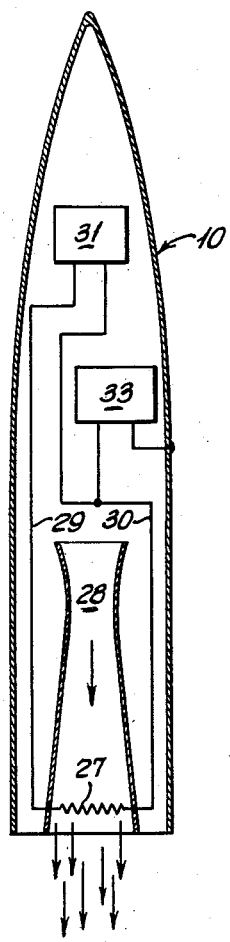

United States Patent Office 3,095,167
Patented June 25, 1963

3,095,167
APPARATUS FOR THE PROMOTION AND CONTROL OF VEHICULAR FLIGHT
Horace C. Dudley, 120—41 Springfield Blvd., Cambria Heights 11, N.Y.
Filed Jan. 5, 1960, Ser. No. 581
2 Claims. (Cl. 244—62)

This invention relates to the promotion and control of the flight of vehicles such as rockets, aircraft and the like and more specifically concerns an improved method and apparatus involving the utilization of electrostatic energy for the attainment of more efficient flight and greatly enhance vehicular payload capabilities.

The objects and advantages of the invention will be set forth in part hereinafter and in part will be obvious herefrom, or may be learned by practice with the invention; the same being realized and attained by means of the parts, combinations and steps pointed out in the appended claims.

The invention consists in the novel steps, construction, arrangements, combinations and improvements herein shown and described.

The accompanying drawings referred to herein and constituting a part hereof illustrate an embodiment of the invention, and together with the description, serve to explain the principles of the invention.

In the drawings:

FIG. 1 is a diagrammatic view illustrating one embodiment of the invention;

FIG. 2 is a diagrammatic view of a cross section through the earth's atmosphere and part of the surrounding space and illustrates certain features of the invention;

FIGS. 5 through 10 are diagrammatic views of missile structures in accordance with the invention.

Figure 3:
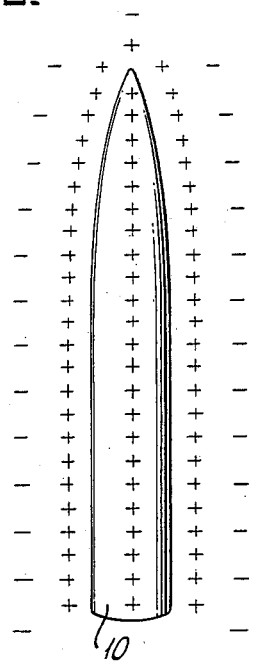
FIGS. 3 and 4 are diagrammatic views showing electrical charge distributions for the attainment of certain objectives of the invention.

It is well known that one of the more formidable difficulties that has been encountered in the development of vehicles and particularly vehicles for flight in the earth's atmosphere and surrounding space has been the provision of adequate power to facilitate the carriage of heavy payloads. Prior efforts in this direction have been concerned substantially wholly with the design and manufacture of improved power plants that will afford increased thrust. In so doing, however, fuel requirements are drastically increased and improved fuels of lighter weight are required to realize the advantages of improved engines. In the case of rockets and missiles the foregoing problems are particularly serious and tremendous sums of money have been and are being expended to accomplish space flight with perhaps the major expenditures being utilized for improved propulsion systems.

This invention has as one of its objectives the attainment of improved aerial vehicle propulsion by means independent of conventional propulsion devices that will materially increase the effective thrust with relatively small increase in weight. This end is attained in part through the utilization of an improved vehicle structure which enables the establishment of an appropriate electrical charge carried by the vehicle relative to the surrounding atmosphere and in part by an improved system for the establishment of an electrostatic charge on the vehicle to counteract, at least in part, gravitational forces.

The invention further contemplates a novel and improved method and apparatus for assisting the propulsion of aerial vehicles and particularly rockets and missiles which includes the provision of systems for the creation of electrostatic charges on the surface of the missile that will react with electrostatic charges on the earth to enable the attainment of materially increased velocities of a missile or vehicle in flight. To facilitate an understanding of the advantages gained by the instant invention, actual tests have indicated that missiles or rockets propelled in accordance with the invention, attain materially increased altitudes and stability of flight and in some instances increases in altitude of 500% to 600% are attainable. For instance, it has been found that utilizing rockets having a weight including the propelling charge of the order of 50 to 55 grams, low altitude, unstable flight results when the surfaces of the body are of a non-conducting material. However, when either one or both the inner and outer surfaces of the body are coated with a conductive material such as aluminum varnish or the like, it has been found that stable flight of 300 to 600 feet in altitude can be attained. In one particular instance the rocket body was formed of a high dielectric plastic material having a weight of 53 grams including the propelling charge. When the rocket was fired it traversed an unstable, erratic trajectory of relatively low altitude under 100 feet.

When the identical rocket was coated on the inside with a conductive varnish, stable flight was attained to an altitude of approximately 300 feet. Upon coating of both surfaces of the rocket with a conductive varnish, stable flight was obtained to about 600 feet. The increase in flight stability and the altitude attained by the utilization of conductive surfaces clearly indicates that the electrostatic charge existing on the rocket when fired materially improves both factors of flight.

It has further been found that atmospheric conditions play an important role in missile firings, and this has been shown by the foregoing experiments carried out at relatively low temperatures of the order of 10°–20° F. and even lower. When the tests were repeated in the summer time at temperatures of 70°–80° F. and with attendant high humidity, the results attained by the utilization of conducting rocket surfaces could not be duplicated. It also follows from the foregoing tests which dictate the importance of the utilization of conductive rocket coatings, that if the rocket is actually given an appropriate electrostatic charge prior to firing, further increased altitudes will be attained under a given set of conditions. To support this conclusion, it has been demonstrated that a missile, such as a ball of conductive material, can be projected upwardly against the action of gravity by placing a relatively high charge of the order of 400,000 to 500,000 volts on the ball by means of a suitable electrostatic generator. With this procedure altitudes of as much as 10 centimeters were attained without the use of any propelling charge and proves that gravity can not only be counterbalanced by electrostatic charges, but also that such charges can actually propel a missile from the earth's surface.

The foregoing experiments clearly demonstrate the advantages of constructing and firing rockets in accordance with the invention and it follows that electrostatic conditions of the earth and atmosphere can be utilized to advantage. For instance, in the firing of rockets and missiles in accordance with the invention, it is particularly desirable to select areas on the surface of the earth to launch missiles that will afford the greatest potential gradient and thus take maximum advantage of the thrust that can be accorded by electrostatic means in accordance with the invention. In studies reported by J. A. Chalmers in a publication entitled "Atmospheric Electricity" and published by the Oxford University Press, in London in 1949, it was found, for example, in Kew, Surrey, England, that the maximum potential gradient during the summer time was approximately 310 volts per meter, whereas in the winter time this gradient was 550 volts per meter. Other geographical locations indicated different potential gradients with relatively low gradients being experienced in the South Seas area and over ocean areas. Since the ocean and tropical areas have generally uniformly high humidity, it follows that the potential gradient would be much lower than the gradients over land areas where the humidity is low. Higher altitudes would also be more favorable than the lower altitudes.

Another factor which emphasizes the importance of the instant invention, involves a consideration of the various forces which interact in retaining objects on the surface of the earth or other body. In the case of the earth, one of the significant forces is gravity, which is the property of any mass. The nature of this force is not known, though it has been found that its magnitude varies, depending on the density of the particular portion of the earth at which it is measured. A force which counteracts the effect of gravity is centrifugal force produced by rotation of the earth so that in the absence of centrifugal force the effect of gravity would be far more pronounced. Still another force which may either supplement or detract from the force of gravity is that produced by electrostatic energy. If a body on the surface of the earth has a charge opposite to that of the earth, it will of course be attracted; while if the charge is similar to that of the earth, the effect of gravity will be reduced. If the difference in charges are significant, as indicated by the foregoing experiments, the effect of gravity can be completely counterbalanced. Counterbalance of gravity will obviously contribute materially to the speed and altitude of a missile or rocket leaving the surface of the earth and, from tests actually carried out on miniature devices, it has been shown that the advantage attainable would be equivalent to increasing the thrust of a rocket engine 5 to 6 times without adding materially to the weight of the missile. In the case of a given rocket that may have a thrust of 300,000 foot lbs., then, by counterbalancing the effect of gravity through the utilization of electrostatic charges, it is conceivable that the resultant thrust would be of the order of 1,500,000 foot lbs.

In FIG. 1 of the drawings there is illustrated diagrammatically one arrangement for supporting a missile in accordance with the invention to minimize the effect of gravity, if not counterbalance it completely, during the firing period. In this figure the rocket is denoted by the numeral 10 and is insulated from the earth by high voltage insulating supports 11 which in turn carry inclined supporting elements 13 engaging the rocket 10. The elements 13 may be of a conductive material and the rocket may include short fins 14 or other means for engaging the supporting members 13. While only two supports 11 and 13 are illustrated, it is evident that any number of supports may be used. The rocket in the supported position shown in FIG. 1 is charged by the application of a suitable potential thereto. Since a high voltage at very little current is required, a power source such as the electrostatic generator 15 may be used and connected between one of the supports 13 or the rocket proper, and ground. In the normal case the generator 15 is polarized to place a positive charge on the rocket 10 relative to the ground or earth, which normally has positive charge. By raising the positive electrostatic charge of the rocket well above the positive charge of the earth, as for instance a charge greater than 25,000 volts, a materially increased rocket velocity can be attained with a given propelling charge. Since certain of the outer layers of the atmosphere have a high negative charge, it follows that if a high positive charge is maintained on the rocket 10 during flight, additional velocity will be imparted to the rocket by reason of the attraction of the rocket toward zones of opposite charge.

FIG. 2 of the drawings will afford an example of the nature of the electrostatic charges of the atmosphere relative to the earth. The earth is normally charged positively relative to the atmosphere and the latter has a substantial voltage gradient. The ionosphere, at about 60 miles above the earth, has a charge of approximately 350,000 volts negative; at approximately 500 miles the charge is of the order of 1,000,000 volts or more negative; and the Van Allen zone, which is located about 1200 miles from the earth has a still greater negative charge, the magnitude of which is no known. It will be seen, therefore, that a rocket, indicated in this figure by the letter R, having even a modest positive electrostatic charge of the order of 25,000 volts, would be afforded considerable added acceleration during its flight by reason of the constantly increasing negative charge of the atmosphere surrounding the earth. It is important, however, that during the flight of the rocket R that the positive charge be maintained in order to effect the desired results. The magnitude of the effect of a positive charge on a body projected outwardly from the surface of the earth can be determined by the formula $$F_e = \frac{Q_1 \cdot Q_2}{D^2}$$

where $F_e$ is electrostatic attraction; $Q_1$ and $Q_2$ are charges of opposite sign and D is the distance between the surfaces of the charged bodies, provided, however, the diameter of one of the spheres is large with respect to D.

Thus it will be seen that when a positive charged body leaves a positively charged zone, it will be attracted to a negatively charged zone at a rate which increases logarithmically, provided, however, that the charged body retains its original positive charge. Thus, referring again to FIG. 2, it will be seen that as the rocket leaves the surface of the earth, the electrostatic force moving the rocket toward the Van Allen layer will increase logarithmically and thereby afford constantly increasing acceleration with a resultant increase in efficiency and the ability to carry materially greater payloads.

Figure 4:
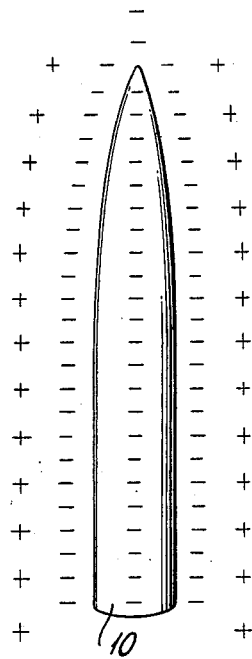

In addition to the utilization of an electrostatic charge to minimize or even overcome the effect of gravity, it is believed that still another effect occurs which results in the reduction of friction between the rocket and the atmosphere and contributes to the efficiency of the rocket or missile as well as other types of aerial vehicles. The phenomena is shown in FIG. 3 which illustrates a rocket 10 having a positive charge on the conductive outer shell. In positively charging the outer shell of a rocket or other aerial vehicle, it follows that the adjacent molecules of gas will become positively ionized and take on substantially the same charge as that of the vehicle. Inasmuch as molecules of gas adjacent to the surface of the vehicle assume the same charge as the vehicle, they will be repelled and the vehicle will therefore move in what may be termed a "self-generated vacuum" induced by the charge on the vehicle itself. From the tests outlined above, it would appear that the highly stable flight obtained with test rockets utilizing conductive coatings can be attributed to this effect and as a result, higher velocities and more stable trajectories are attainable with a given absolute thrust. FIG. 4 is similar to FIG. 3 and illustrates the reverse effect that would be produced should the atmosphere surrounding the missile 10 have a positive charge. In this case the missile would be given a negative charge and the molecules of air or gas immediately adjacent the missile would also take on a negative charge and again produce the so-called "partial vacuum."

The effect described above in connection with FIGS. 3 and 4 will have an important bearing on the re-entry of high altitude rockets and other aerial vehicles into the earth's atmosphere. It is well known that one of the important difficulties presently encountered with re-entry problems is the matter of heat generated in the vehicle by reason of the friction between the atmosphere and the vehicle when operating at speeds in excess of 1,000 miles per hour. With this invention the application of a charge on the vehicle which is opposite to that of the surrounding atmosphere will tend to charge and repel the molecules of gas adjacent to the vehicle and in so doing, reduce the friction and the resultant heat generated thereby.

Figure 5:
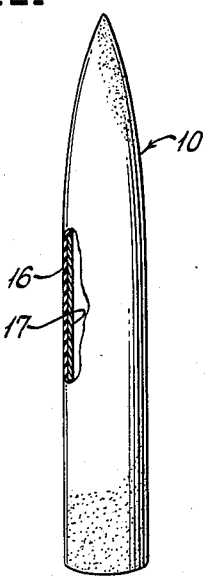
Figure 6:
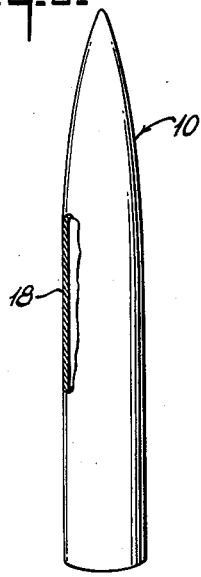

Numerous procedures may be employed in obtaining the desired electrostatic charges on missiles or other aerial vehicles, though in any instance it is important that the outer surface or other portion of the vehicle can receive and will retain an electrostatic charge. In FIG. 5 the rocket 10 is illustrated with an outer layer 16 of dielectric material and an underlying layer 17 of conductive material. In FIG. 6 a rocket 10 is illustrated with an outer layer 18 of conductive material. The outer layer may be of any suitable material such as a metal or a conductive coating such as metallic varnish or the like. The outer configuration should be devoid of all sharp edges, points, fins, trailing wires and other configurations that would result in the production of corona and the loss of the electrostatic charge on the surface of the vehicle. All surfaces should, of course, be smooth and have the greatest possible radius of curvature and the surface should be large relative to the mass. In certain cases it may be desirable to coat the vehicle with a dielectric material as shown in FIG. 5 to aid in the retention of the charge and tests conducted to date have indicated that materials such as shellac and certain of the plastic lacquers produce excellent results. It is evident, however, that in the case of exceedingly high altitude missiles it may be desirable to use other types of coatings.

Figure 7:
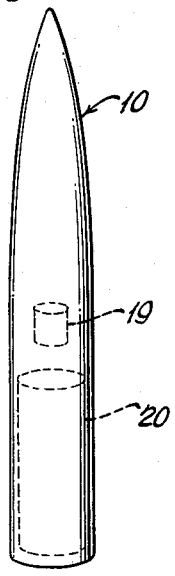

The procedures for applying an initial charge to a rocket or missile was illustrated in FIG. 1. Other procedures may of course be employed for the attainment of this end. During flight of the vehicle appropriate means must be carried for the maintenance of the desired electrostatic charges on the surface of a missile. Such means may include the utilization of well known radioactive materials such as radioactive chlorine, beryllium, nickel, argon and manganese, either alone or in combination with other elements, which produce a positive electrostatic charge through radioactive decay caused by electron capture. Other radioactive substances such as plutonium, thorium, polonium and radium also produce a positive electrostatic charge through the emission of alpha particles. Vanadium, iodine and iron in their radioactive forms decay through the emission of positrons (beta particles) and thus produce a positive charge on the adjoining conductive surfaces. In the use of radioactive materials they may either be combined with the outer dielectric layer 16 such as shown in FIG. 5 or may be included in pellet form within the rocket, as denoted by the numeral 19 in FIG. 7. The numeral 20 of FIG. 7 denotes a conventional rocket motor.

Another procedure that may be utilized in the attainment of electrostatic charges on the vehicle involves the introduction of particles, fluids or gases into the jet engine or other propelling device and which, upon ejection, will result in the establishment of a predetermined charge on the vehicle. In FIG. 8 the vehicle 10 includes a rocket motor diagrammatically illustrated at 21 and having fuel tanks 22 and 23 coupled with the rocket motor 21. A third tank or reservoir 24 may contain solid, gaseous or liquid materials that are delivered to the rocket motor and exhausted therefrom during the flight of the rocket. As examples of materials that may be utilized in this way for producing a charge on the rocket 10, water droplets or vapor will result in the establishment of a positive charge and similar results will obtain with talc dust. Negative charges will be produced by the utilization of carbon dust, hydrocarbon droplets and certain powdered metals. The fact that exhausts of vehicles can be utilized to produce the electrostatic charges in accordance with the invention is supported by observations made by C. J. Brasefield, and reported in the June 1959 issue of "Science," vol. 129, No. 3363, page 1610. In the abstract of this article it is pointed out that exhaust gases of motor vehicles may be either positively or negatively charged, depending on whether or not they contain a predominance of water droplets or carbon particles.

FIGS. 9 and 10 illustrate further procedures for creating electrostatic charges on aerial vehicles. In FIG. 9 the vehicle 10 includes propelling means 20 and a vessel 25 containing a liquid, such as water, or a powdered solid, such as talc, to be exhausted from the vehicle through nozzles or orifices 26 in the surface thereof. In FIG. 10, the aerial vehicle 10 includes a hot wire grid, coil or other suitable structure 27 disposed in the exhaust of the rocket motor 28. The hot wire is connected by lead wires 29 and 30 to a source of electric energy 31 such as a generator, batteries, solar cells or the like. A second high voltage generator 33 is connected between the lead wire 30 and the vehicle and is arranged to polarize the hot wire 27 negatively. In this way electrons leaving the filament 27 will be carried away from the vehicle by the exhaust of the rocket motor gases and leave the vehicle or rocket positively charged. In certain cases the wire 27 may be heated solely by the exhaust gases in which instance the power source 31 would not be required.

Other methods and apparatus may be employed for effecting the desired charges on the surface of a vehicle, including the use of magnetic fields through which hot gases are deflected and ionized. Such systems are termed magnetohydrodynamic systems and can be effectively used for the attainment of the objectives of this invention. It is also evident from the foregoing description that the electrostatic rocket charge can be modified in the course of flight, depending on the characteristics of the surrounding atmosphere and the objectives to be attained.

From the foregoing description it is clear that increased effective thrust may be obtained with aerial vehicles of all types through the utilization of electrostatic charges on the surfaces of the vehicles, whether or not the vehicle is traveling away from the earth or through a path concentric with the surface of the earth. In connection with rockets and missiles which are generally directed in perpendicular paths through at least part of their trajectory, the utilization of charges will actually supplement the thrust of the rocket produced by its normal propelling means, and can materially reduce, if not altogether neutralize, the effect of gravitational force. This facilitates more efficient missile operation with the result that much larger payloads may be carried without significantly increasing the weight of the rocket by the utilization of larger propelling means. By electrostatically charging aerial vehicles in the manner described above and selecting launching sites wherein relatively low humidity is encountered, the high voltage gradient resulting from low humidity further increases the efficiency of operation of the vehicle and particularly missiles and rockets.

While the aerial vehicle, as pointed out above, should be formed of a conductive material or one capable of receiving and holding an electrostatic charge, elements such as hydrogen, lithium, beryllium, boron, carbon, nitrogen, and oxygen are particularly useful since a positive charge of 25,000 volts will cause at least fifty percent of the orbital electrons of the K and L shells of these elements to be ionized. This degree of ionization of an atom reduces gravitational attraction or the effect of such attraction by the earth to zero for that atom. This factor coupled with the attraction of the missile to negative layers of the atmosphere affords substantially increased effective thrust with little increase in weight of the vehicle.

It is also evident that vehicular control can be accomplished by controlling the electrostatic charge. For instance, the reduction of buoyancy or lift can be accomplished by the reduction of the positive electrostatic charge by the emission of negative particles from a radioisotope or by exhausting positively charged particles from the vehicle.

While only certain embodiments of the invention have been illustrated and described, it is understood that changes, modifications and alterations may be made without departing from the true scope and spirit as defined by the appended claims.

What is claimed is:

1. An aerial vehicle comprising an outer substantially corona-free shell of electrostatically chargeable material, propulsion means carried by said vehicle, a reservoir carried by said vehicle, at least one discharge conduit coupled with said reservoir and extending through said shell and a material carried by said reservoir for discharge through said conduit and from said vehicle independently of said propulsion means during flight of the vehicle to electrostatically charge said vehicle shell.

2. An aerial vehicle comprising an outer substantially corona-free shell of electrostatically chargeable material, propulsion means carried by said vehicle including a rocket motor having an exhaust duct and fuel tanks connected to said motor for operation thereof, a reservoir carried by said vehicle, at least one conduit connecting said reservoir with said exhaust duct and material carried by said reservoir and discharged from said vehicle during flight through said conduit and exhaust duct to electrostatically charge said vehicle shell.

References Cited in the file of this patent

UNITED STATES PATENTS

| | | |
|---|---|---|
| 1,974,483 | Brown | Sept. 25, 1934 |
| 2,102,527 | Hadley | Dec. 14, 1937 |
| 2,946,541 | Boyd | July 26, 1960 |
| 3,022,430 | Brown | Feb. 20, 1962 |

FOREIGN PATENTS

| | | |
|---|---|---|
| 635,784 | Great Britain | Apr. 19, 1956 |